July 2, 1946.   M. BAER   2,403,206
DIELECTRIC COMPOSITION AND METHOD OF MAKING SAME
Filed June 18, 1943

INVENTOR.
MASSIMO BAER
BY
ATTORNEY

Patented July 2, 1946

2,403,206

UNITED STATES PATENT OFFICE 2,403,206

DIELECTRIC COMPOSITION AND METHOD OF MAKING SAME

Massimo Baer, Plainfield, N. J., assignor to Cornell-Dubilier Electric Corporation, South Plainfield, N. J., a corporation of Delaware Application June 18, 1943, Serial No. 491,345

2 Claims. (Cl. 252—66)

My invention relates to dielectric organic compounds and methods of making such compounds.

Various halogenated organic compositions, such as chlorinated naphthalene and chlorinated diphenyl have been proposed as dielectrics for transformers, condensers and other electrical apparatus both for direct use in the form of liquid or solid insulators surrounding the apparatus and contained in a suitable container and by using the liquid dilectrics to impregnate the porous spaces of another insulator or dielectric, in particular, a porous fibrous insulator, such as paper, fabrics or the like.

Whereas, chlorinated diphenyl as a dielectric has been successfully used in the past, other halogenated compounds, in particular, chlorinated naphthalenes have not been fully satisfactory due to their poor dielectric and other electrical properties.

Accordingly, an object of my invention is to provide an improved dielectric composition of the above characteristic and a method of preparing same.

A more specific object is to provide a new process of transforming chlorinated naphthalenes possessing poor dielectric and other electrical properties into compositions of high dielectric and other desirable characteristics.

Figure 1:
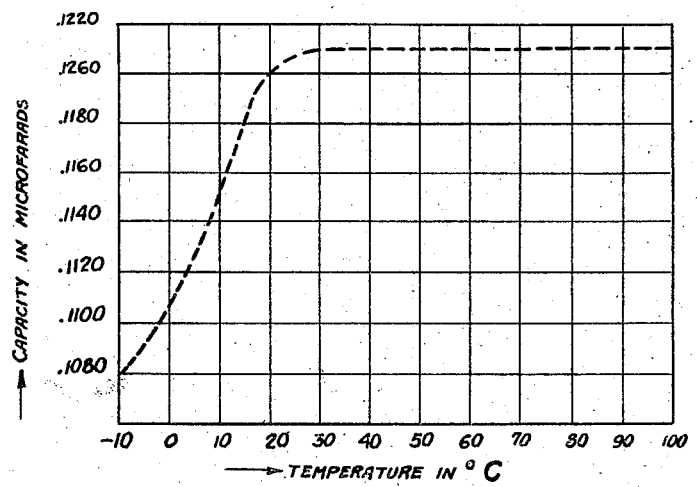
Figure 2:
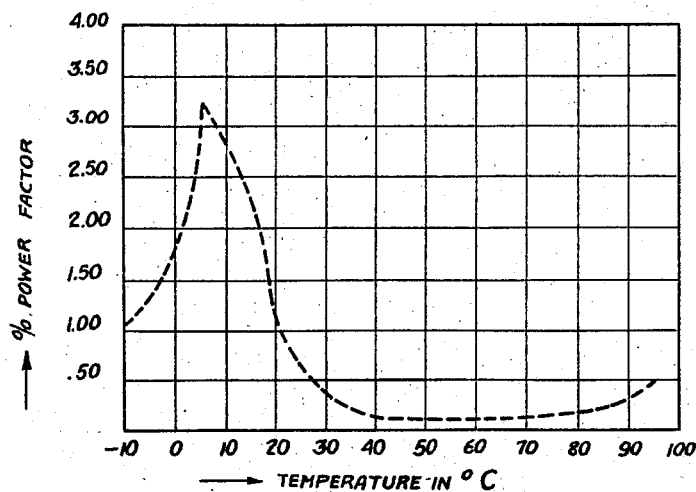

On the accompanying drawing there are shown in Figures 1 and 2 graphs illustrative of some of the improved characteristics of the novel dielectric compound obtained by the invention.

With the foregoing and other objects in view as will appear hereafter, the dielectric compound according to the invention consists substantially of a condensation product of chlorinated naphthalene, in particular of the lower chlorinated naphthalenes, and the chlorides of sulphur or any other compound capable of generating sulphur chloride during the reaction.

One method of carrying out the invention consists in condensing the lower naphthalenes, such as monochloronaphthalene, dichloronaphthalene and trichloronaphthalene or a mixture thereof in various proportions with one or more chlorides of sulphur, such as sulphur monochloride and sulphur dichloride, preferably in the presence of a catalyst. In a preferred mode of carrying out the invention, the catalyst consists of activated aluminum oxide.

The condensation product or resin obtained in this manner has different consistencies depending on the ratio of chlorinated naphthalenes to chloride of sulphur used. If the amount of chlorinated naphthalenes is maintained constant, the consistency of the resin obtained will vary from light mobile oils to viscous oils and to solids with increasing quantities of chlorides of sulphur used. A solid resin may also be obtained from an oily resin by removing any unreacted chloronaphthalene by means of vacuum or steam distillation or in any other suitable manner.

The success of the condensation depends mainly on the choice of a proper catalyst. As pointed out, aluminum oxide has been found to be well suited for such a condensation.

When activated aluminum oxide is used as a catalyst, practically all the chlorine combined with the sulphur is eliminated as hydrogen chloride, the hydrogen being derived from those carbon hydrogen bonds which have been broken by the formation of the new carbon sulphur bond. The sulphur atom, therefore, joins two naphthyl chloride groups with the formation of a sulphide or disulpnide.

When catalysts other than aluminum oxides are used, part of the chlorine of the chlorides of sulphur enters the naphthalene nucleus, whereby to produce substitution products and some addition products which may be objectionable in certain cases because of their instability. Activated aluminum oxide as a catalyst has been found to eliminate all the chlorine of the chlorides of sulphur. A nearly theoretical amount of hydrogen chloride is evolved during the reaction.

Other catalysts like aluminum, zinc, iron or chlorides or sulphides of these metals and other metals, while useful and effective, have been found to be less successful but other activated bleaching earths can be used with equal advantage depending on the circumstances and requirements.

By the process according to the invention, chlorinated naphthalenes possessing poor dielectric properties are transformed into condensation products or resins of good dielectric properties and other electrical characteristics. Some of the advantages obtained by the invention are as follows: (1) High dielectric constant with relatively small variations within a wide temperature range. The dielectric constant observed by tests varied from 3.9 to 4.1 over a temperature range from 20° to 100° C. The dielectric constant at 25° C. of impregnated kraft paper was found to be about 5.2. (2) Low power factor of impregnated condensers over a wide temperature range. According to practical tests, the power factor at 1000 cycles was found to range from .25% at room temperature to .5% at 95° C. (see Figure 2). (3) High insulation resistance found to be 6000 megohms per microfarad for a paper condenser employing kraft paper impregnated with the compound according to the invention. (4) High voltage breakdown found to be about 3800 volts D. C. for a condenser employing 3 layers of .0003" kraft paper and impregnated with the novel dielectric composition according to the invention. (5) Chemical stability. (6) No tendency towards crystallization. (7) Non-inflammability.

The graphs shown in Figures 1 and 2 give a more detailed presentation of the changes in capacity and power factor, respectively, of a capacitor unit impregnated with the novel dielectric prepared in accordance with the invention. The curves shown apply to a capacitor wound with three layers of .0003" kraft paper.

The following illustrates by way of example, a practical process for carrying out the invention. The reagents used are: (1) 2.25 mols of monochloronaphthalene or a mixture of chlorinated naphthalenes. (2) 1 mol of sulphur chloride. (3) A mixture of 40 and 80 mesh activated alumina (about 6% or less of the total weights of the reagents).

In carrying out the process, 2.25 mols of dry monochloronaphthalene or a mixture of chlorinated naphthalenes, such as a mixture composed of 60% monochloronaphthalene, 30% dichloronaphthalene and 10% trichloronaphthalene are introduced into a flask or other suitable vessel. This material is heated to 70° C. and to it are added 50 grams of activated aluminum oxide. As soon as the latter has been introduced, sulphur chloride is slowly added from a dropping funnel or in any other suitable manner, while the mass is stirred vigorously. The rate of addition of sulphur chloride should be maintained constant. The temperature is raised to 90–95° C. during the addition of the sulphur chloride and then maintained constant at this temperature. The addition should last about six hours. The mass is then stirred for a few more hours until hydrogen chloride is no longer evolved. The reaction vessel must be fitted with a water cooled reflux condenser so as to run back into the reaction vessel any sulphur chloride or chlorinated naphthalene which may have volatilized. Hydrogen chloride and a small quantity of hydrogen sulphide are evolved during the condensation.

The resinous product obtained in this manner is then thinned with a solvent such as benzene and separated from the catalyst by filtration. The solution is then washed with water and neutralized. The solvent is steam distilled and the resin so obtained is freed from water by heating in vacuo. The final resin compound so obtained has a pale orange color and may be further improved and purified by the use of small quantities of activated alumina as an absorbing agent.

While the invention has been described in terms of a specific embodiment it is to be understood that it is of a broad application in that among others, various proportions of chlorinated naphthalenes and chlorides of sulphur may be used with equal advantage, the limits of the invention being defined by the scope of the appended claims.

I claim:

1. A method of producing a dielectric which comprises heating a mixture of 2.25 mols of dry monochloronaphthalene to about 70° C., adding about 50 grams of activated aluminum oxide, adding 1 mol of sulphur chloride at a constant rate while vigorously stirring the mass, raising the temperature to about 90–95° C. and continuing stirring until hydrogen chloride is no longer evolved, thinning the resinous product obtained and separating it from the aluminum oxide by filtration, neutralizing and washing the solution with water, steam distilling the solvent and freeing the resin so obtained from water by heating in vacuo.

2. A method of producing a dielectric which comprises treating a mixture of 2.25 mols of 60% monochloronaphthalene, 30% dichloronaphthalene and 10% trichloronaphthalene to about 70° C., adding 50 grams of activated aluminum oxide, adding 1 mol of sulphur chloride at a constant rate while vigorously stirring the mass, raising the temperature to about 90–95° C. and continuing stirring until hydrogen chloride is no longer evolved, thinning the resinous product obtained and separating it from the aluminum oxide by filtration, neutralizing and washing the solution wtih water, steam distilling the solvent and freeing the resin so obtained from water by heating in vacuo.

MASSIMO BAER.